(12) United States Patent
Güntherberg et al.

(10) Patent No.: US 6,187,825 B1
(45) Date of Patent: Feb. 13, 2001

(54) METHOD AND DEVICE FOR THE CONTINUOUS COAGULATION OF AQUEOUS DISPERSIONS OF GRAFT RUBBERS

(75) Inventors: Norbert Güntherberg, Speyer; Jürgen Hofmann, Ludwigshafen, both of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/331,416

(22) PCT Filed: Dec. 23, 1997

(86) PCT No.: PCT/EP97/07261

§ 371 Date: Jun. 21, 1999

§ 102(e) Date: Jun. 21, 1999

(87) PCT Pub. No.: WO98/28344

PCT Pub. Date: Jul. 2, 1998

(30) Foreign Application Priority Data

Dec. 23, 1996 (DE) .............................. 196 54 169

(51) Int. Cl.[7] .......................... B01D 17/038; C08C 1/14; C08J 3/16
(52) U.S. Cl. ............... 516/197; 523/335; 528/502 F; 528/936
(58) Field of Search ................. 516/197; 366/264; 210/512.3; 528/936, 502 F; 523/335

(56) References Cited

U.S. PATENT DOCUMENTS

| | | | |
|---|---|---|---|
| 1,989,241 | * 1/1935 | McGavack | 523/335 X |
| 2,619,330 | 11/1952 | Willems | 259/96 |
| 2,985,389 | * 5/1961 | Willems | 366/264 X |
| 3,821,348 | 6/1974 | Planz | 264/182 |
| 4,299,952 | 11/1981 | Pingel et al. | 528/500 |
| 4,634,734 | 1/1987 | Hambrecht et al. | 525/85 |
| 4,668,738 | 5/1987 | Lee et al. | 525/83 |
| 4,788,253 | 11/1988 | Hambrecht et al. | 525/83 |
| 4,831,116 | 5/1989 | Henton | 528/492 |

FOREIGN PATENT DOCUMENTS

| | | |
|---|---|---|
| 2917321 | 4/1979 | (DE) . |
| 3617721 | 5/1986 | (DE) . |
| 344399 | 12/1989 | (EP) . |
| 459161 | 12/1991 | (EP) . |

* cited by examiner

Primary Examiner—Richard D. Lovering
(74) Attorney, Agent, or Firm—Keil & Weinkauf

(57) ABSTRACT

A process for the continuous coagulation of aqueous dispersions of graft rubbers suitable for toughening thermoplastics is described. In the process, dispersions are transported through an apparatus having at least one shear element with a slotted stator and a rotating of the rotor within the stator, so that said dispersions are passed radially from the inside to the outside as a result of the rotation of the rotor in the shear element and, during or after passage through the slots of the rotor and stator, are subjected to such strong shearing that they coagulate, resulting in graft rubber coagulums which can be readily worked up even at a solids content of more than 50% by weight of elastomers.

7 Claims, 3 Drawing Sheets

METHOD AND DEVICE FOR THE CONTINUOUS COAGULATION OF AQUEOUS DISPERSIONS OF GRAFT RUBBERS

This application is a 371 of PCT/EP97/07261 filed Dec. 23, 1997.

The invention relates to a process for the continuous coagulation of aqueous graft rubber dispersions in an apparatus having at least one stator/rotor combination as a shear element, and an apparatus for this purpose.

It is known that the impact strength of hard thermoplastic polymers can be increased by mixing them with graft rubbers. The resulting polymer blends, for example as ABS or ASA polymers, play an important industrial role in the production of industrial plastics articles. Such graft rubbers which serve for toughening hard thermoplastics have long been known as impact modifiers in the plastics industry. They are graft copolymers in which a particle shell (P2) of monomers forming hard thermoplastics is grafted onto soft particle cores of rubbers (P1), such as elastomeric diene polymers or elastomeric acrylate polymers. The graft shell (P2) is prepared by polymerization or copolymerization of monomers or monomer mixtures forming the hard graft shell (P2) by mass, solution, suspension or emulsion polymerization in the presence of the soft elastomer or elastomers (P1). It is preferable to carry out the graft polymerization, at least in the final phase, as a polymerization in aqueous emulsion, anionic emulsifiers preferably being present. The preparation of the graft rubbers thus gives a large amount of aqueous graft polymer dispersions which can be worked up to give the solid graft polymers.

As disclosed, for example, in DE-A 3149358 or EP-B 459161, the aqueous graft rubber dispersions are as a rule precipitated by the addition of coagulants, generally used coagulants being aqueous solutions of water-soluble inorganic or organic acids and/or salts thereof, such as alkali metal and alkaline earth metal chlorides, sulfates or phosphates, eg. calcium chloride or magnesium sulfate solutions. The coagulation or precipitation is generally carried out batchwise but may also be effected continuously (EP-B 459161). The precipitated coagulums which have been filtered off are then washed and dried in a known manner. A known disadvantage of precipitation by the addition of acids or salts as coagulants is that impurities often remain in the worked-up polymers and may impair the product properties.

DE-C 2917321 discloses a process for isolating polymers which have a softening range above 100° C. from an aqueous emulsion, the aqueous emulsion being coagulated in an extruder by shearing and/or heating to temperatures above the softening range of the polymers, the coagulum then being fused and being discharged in a hot state under pressure from the extruder. The water is then separated off in a subsequent process step. The process is very energy-consumptive and requires a counter-rotating intermeshing twin-screw extruder for the precipitation. Moreover, ammonium acetate is used as an assistant for accelerating the coagulation.

U.S. Pat. No. 3,821,348 describes a process in which mixtures of from 70 to 80% by weight of acrylonitrile (AN) and from 20 to 30% by weight of methyl acrylate (MA) are polymerized in emulsion with subsequent addition of 12% by weight of butadiene or in the presence of 9% by weight of butadiene/acrylonitrile rubber (based in each case on the sum of the amounts of AN+MA). The resulting acrylonitrile copolymer dispersions or graft polymer dispersions are coagulated to a paste in a Waring mixer as the shearing apparatus and then shaped in an extruder, through a fine die, the thin rods which are introduced into hot water. The product is then washed, dried and processed in a compression mold at 150° C. to give rods. The description of the process is limited to copolymers having a high acrylonitrile content and very low content of elastomeric butadiene/acrylonitrile rubber.

In U.S. Pat. No. 4,668,738, which refers to the prior art of the above-mentioned U.S. Pat. No. 3,821,348, it is stated that aqueous dispersions having a rubber content of more than 50% by weight of the solids content give readily processible products only when dispersions of styrene/acrylonitrile copolymers as a hard component, in amounts which reduce the rubber content of the copolymer blend to, preferably, less than 50% by weight (based on the total solids content), are mixed with the dispersions before their coagulation by shearing. A disadvantage of the process is that graft rubber dispersions which are prepared for toughening thermoplastics generally have a rubber content of more than 50% by weight of the solids content and can therefore be processed after the process only with the addition of dispersions of the hard component, ie. with a change of the overall composition of the polymers.

It is an object of the present invention to provide an economical process for the continuous coagulation of aqueous dispersions of graft rubbers which are suitable for toughening hard thermoplastics in the preparation of ABS and in particular ASA polymers, which process can be carried out without the addition of chemical coagulants and without the addition of other polymer dispersions, so that the polymers in the coagulated emulsions have the same overall composition as the polymers in the starting emulsions. Furthermore, in the process dispersions of graft rubbers having a rubber content of more than 50% by weight, based on the solids content, should also be capable of being coagulated to give moist free-flowing powders or moist sludge which can readily be worked up, without them having to be mixed with hard acrylonitrile copolymer dispersions prior to coagulation.

We have found that these objects are achieved in general if the graft rubber dispersions are transported through an apparatus having at least one shear element which has a circular slotted stator and a slotted rotor rotating within the stator, and are thereby subjected to the action of shearing sufficiently strong for coagulation of the dispersion by shearing.

The present invention therefore relates to a process for the continuous coagulation of aqueous dispersions of graft rubbers (P) which are suitable for toughening thermoplastics and a) contain, as soft grafting base (P1), elastomeric polymers and/or copolymers of 1,3-dienes or acrylic esters having a glass transition temperature $T_g$ of less than −10° C. in an amount of from 30 to 85% by weight of the amount of graft rubber (P) and b) contain a hard one-shell or multishell graft shell (P2) comprising monomer units which form a thermoplastic polymer or copolymer having a glass transition temperature $T_g$ of more than +50° C. and whose content of acrylonitrile and/or methacrylonitrile monomer units is from 0 to 45% by weight, and c) at least in the last stage of the graft polymerization, were prepared by emulsion polymerization of the monomers for the graft shell (P2) in the presence of the grafting base (P1), wherein the graft rubber dispersion is transported through an apparatus having at least one shear element with a stationary circular slotted stator and a slotted rotor which rotates within the stator and is mounted on a rotatably mounted drive shaft, so that the graft rubber dispersion introduced into the apparatus is passed radially from the inside to the outside as a result of the rotation of the rotor in the shear element and, during or after passage through the slots of the rotor and stator, is subjected to shearing which is so strong that coagulation of the graft rubber dispersion takes place. The present invention furthermore relates to the use of suitable apparatuses for the coagulation of graft rubber dispersions by shearing and to an apparatus which is modified by displacer elements and is intended for dispersing or coagulating dispersions.

In the novel process, the graft rubber dispersion, which is preferably introduced, in particular sucked, axially into the apparatus (10), is coagulated in shear elements (13, 14, 15) comprising stator/rotor combinations. Slotted rotors (13b, 14b, 15b) are mounted on a rotatably mounted drive shaft (12) within the circular stators (13a, 14a, 15a) which are generally firmly connected to the housing (11) of the dispersing apparatus (10), are in the form of disks and preferably essentially pot-like, and have slots or teeth, the rotors being capable of rotating at high speed within the stator circles. For this purpose, the drive shaft is connected to a motor. The stream of the graft rubber dispersion fed centrally to the first rotor (13b) is caused to rotate by the rotor (13a) rotating at high speed and is transported radially from the inside to the outside by the centrifugal force in the shear element (13). The slots or teeth of the rotor or stator wall through which the graft rubber dispersion is transported by centrifugal force are arranged in the radially outer region of stator and rotor, where the radial speed of the rotor is particularly high. During or after passage through the slots or gaps between the teeth, owing to the very high speed of the rotor relative to the stator, such strong shearing or shear force is exerted on the dispersion particles that the latter collide with one another and the dispersion coagulates. The shear velocities are from 5 to 30, preferably from 6 to 25, m per second. The average residence time of the graft rubber dispersion in the apparatus (10) is in general less than 12, preferably less than 10, particularly preferably less than 8, seconds. The apparatus (10) contains in general from 1 to 3 shear elements (13, 14, 15) connected in series, preferably one shear element or two shear elements, it being possible for their rotors and stators to have at least one row of teeth which is formed by axial slots, or a plurality of concentrically arranged rows or rings of slots or teeth. In addition to single-slot rotors, rotors which have additional blades in the axial and/or radial direction and rotors which are provided with turbine blade-like displacer strips in addition to the shear elements are often advantageous, leading to better product transport and a better suction effect on the dispersion.

The coagulated graft rubber dispersions subjected to shearing in one or more stator/rotor combinations as shear elements are generally obtained in the form of a free-flowing powder or in the form of a moist sludge, which leave the apparatus (10) via a radially arranged outlet orifice and can then be fed directly, ie. without being transported by extruders, to a kettle containing hot water, the use of superatmospheric pressure and of water temperatures above 100° C. being advantageous in some cases. The coagulated graft rubber can be worked up in a simple manner by known methods for further use. In the novel coagulation by shearing, the dispersion used, the precipitation quality, the through-put and the desired coagulum form determine the details of the mode of operation of the apparatus, ie. they determine, for example, the advantageous number of stator/rotor combinations, the slot arrangement or tooth system of rotor and stator and any choice of particular rotor types. This can be determined and optimized in a very limited number of simple experiments. The common purpose is in general to achieve complete coagulation of the polymer dispersion used with a high throughput and with constant overall composition of the polymers and to obtain coagulums which can be further processed very readily.

BRIEF DESCRIPTION OF DRAWINGS

The apparatus used according to the invention is illustrated by way of example in FIGS. 1–3.

Figure 1:
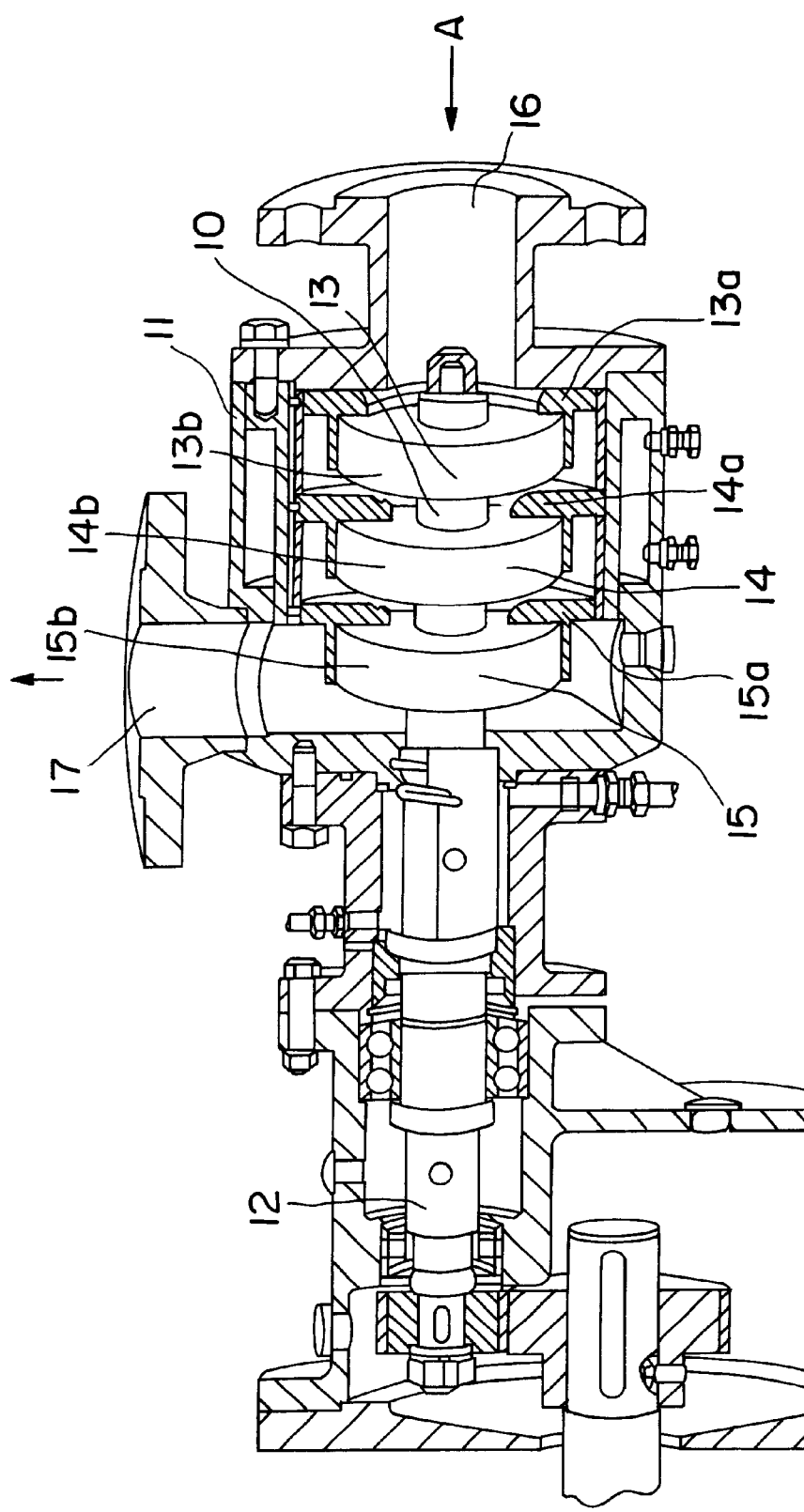
FIG. 1 shows a longitudinal section through such an apparatus, with a perspective view of the rotor.
Figure 2A:
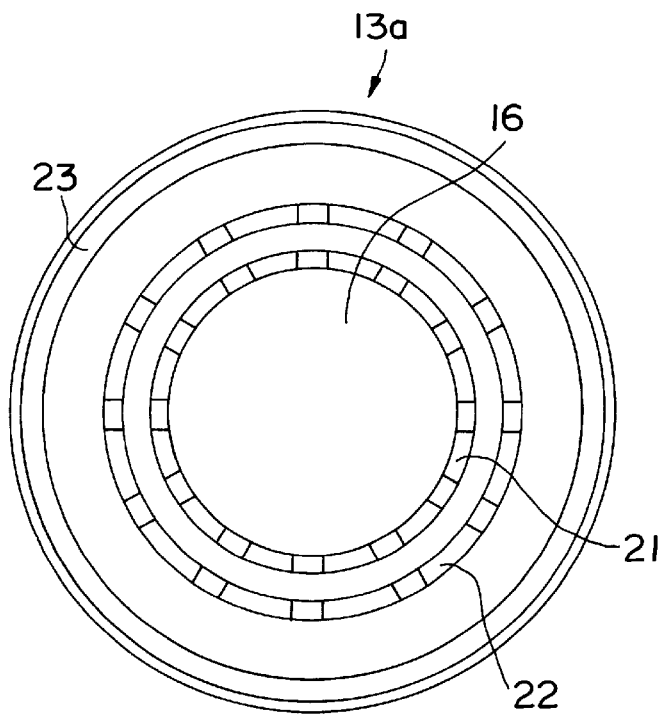
FIG. 2A shows a plan view of a stator from the direction of arrow A in FIG. 1.

A very suitable apparatus (10) for the novel process for the continuous coagulation of graft rubber dispersions by shearing is shown in longitudinal section in FIG. 1, the rotor being shown in perspective view. Such apparatuses are commercially available as dispersing apparatuses, ie. are used for a purpose exactly opposite to coagulation by shearing. Arranged axially in the interior of a housing (11) of the apparatus (10) are two or three shear elements (13, 14, 15), each of which consists of a circular stator (13a, 14a, 15a) as a stationary tool (also see FIGS. 2A and 3A) and of the rotor (13b, 14b, 15b) as a rotating tool rotating within the circular stator. The rotors (13b, 14b, 15b) (also see FIGS. 2C and 3C) are arranged on a rotatably mounted drive shaft (12) generally connected to a motor. The stators and rotors are essentially pot-like, in each case the ring-like wall of the pot-like stator (13a, 14a, 15a) radially overlapping the wall of the associated pot-like rotor (13b, 14b, 15b) by a certain length. The walls are provided with axially oriented, radially continuous slots as passages. The graft rubber dispersion to be coagulated is sucked into the apparatus (10) via an inlet orifice (16) arranged in the axial extension of the drive shaft (12) and is fed axially to the first rotor (13b). Therein, the dispersion is caused to rotate rapidly and is transported by the centrifugal force radially from the inside to the outside, via the slots present in the stator (13a) and rotor (13b), into an annular gap defined between the rotor (13b) and stator (13a). Owing to the high speed of the circumference of the rotor (13b) relative to the stator (13a), a steep shear gradient forms in the turbulent flow in the annular gap. The particles of the graft rubber dispersion therefore collide at high speed and coagulate as a result of the high shear forces. The at least substantially coagulated dispersion emerges radially from the apparatus (10) via the outlet orifice (17), which is at the top in FIG. 1 but may also be at the bottom in another preferred embodiment.

Figure 2B:
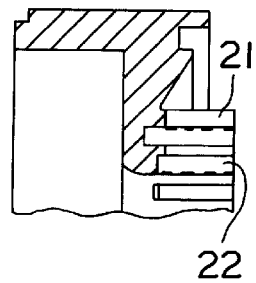
FIG. 2B shows a side view of a partial cross-section of the stator of FIG. 2A.

As stated, rotor and stator are slotted, the axially oriented, radially continuous rotor slots advantageously being provided at or near the circumference of the rotor. Rotor and stator may also have a plurality of concentrically arranged slotted or toothed rings, toothed being considered to be the same as slotted (cf. for example FIG. 2C). Thus, the first rotor (13b) in the apparatus (10) in FIG. 1 has a row of teeth which runs between two radially spaced rows of teeth of the stator (13a). There are therefore two annular gaps in which the coagulation by shearing can take place. The stator (13a) shown in FIG. 2A and 2B has an inner toothed ring (21) and an outer toothed ring (22). The outer stator wall is denoted by (23). The stator shown in FIGS. 3A and 3B has only one toothed ring (21).

Figure 2C:
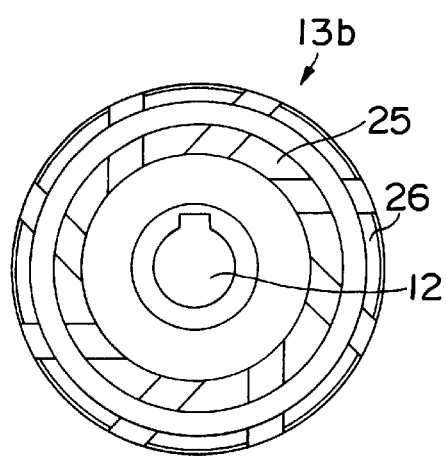
FIG. 2C shows a view of a rotor from the direction of arrow A in FIG. 1.
Figure 2D:
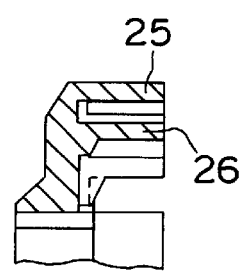
FIG. 2D shows a side view of a partial cross-section of the rotor of FIG. 2C.
Figure 3A:
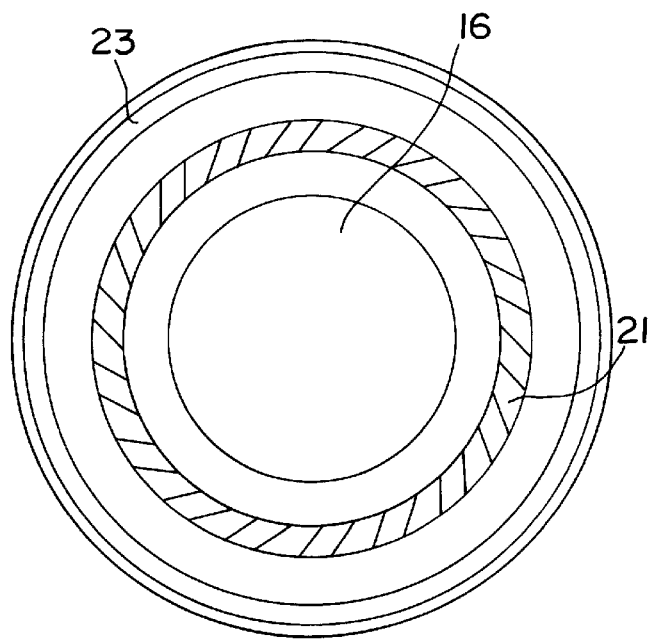
FIG. 3A shows a plan view of a further embodiment of a stator from the direction of arrow A in FIG. 1.
Figure 3B:
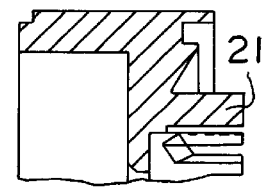
FIG. 3B shows a side view of a partial cross-section of the stator of FIG. 3A.
Figure 3C:
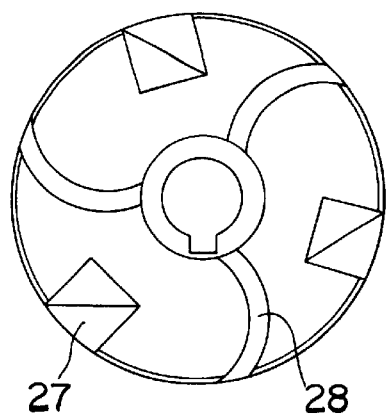
FIG. 3C shows a plan view of a further embodiment of a rotor from the direction of arrow A in FIG. 1
Figure 3D:
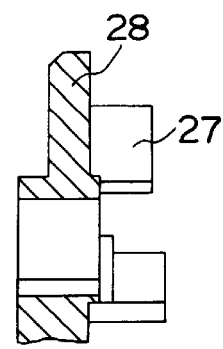
FIG. 3D shows a side view of a partial cross-section of the rotor of FIG. 3C.

The rotor (13b) shown in FIG. 2C and 2D has an inner toothed ring (25) and an outer toothed ring (26). The rotor shown in FIG. 3C and 3D comprises shear elements (27) and turbine blades (impellers) (28).

The coagulation apparatuses used for the novel process are advantageously of multistage form and contain a plurality of, for example 2 or 3, rotor/stator combinations connected in series as shear elements. However, depending on the physical properties of the graft rubber dispersion, it may also be advantageous to use only one rotor/stator combination or two rotor/stator combinations as shear elements, in order to achieve an optimum between precipitation quality, throughput and product properties. FIG. 1 shows an apparatus having three shear elements (13, 14, 15) connected in series. The rotors and stators of the shear elements may have slots or teeth of the same type or of different types. Thus, FIG. 1 shows, in the apparatus (10), a first shear element (13) which contains a stator (13a) having two radially spaced rows of teeth and a rotor (13b) having only one row of teeth. The second shear element (14) of the apparatus (10) has a stator (14a) having three rows of teeth and a rotor (14b) having two rows of teeth which once again are concentrically nested one within the other. The rotor (14b) furthermore has more teeth than the rotor (13b) of the first shear element (13), which are therefore narrower and a smaller distance apart. The third shear element (15) of the apparatus (10) likewise has a stator (15a) having three rows of teeth and a rotor having two rows of teeth, the rotor (15b) once again having more teeth than the rotor (14b) of the second shear element (14).

In the shear elements used for the novel process, the flow of the dispersion is deflected repeatedly so that the dispersion particles cannot pass unprocessed through the apparatus.

Apparatuses similar to that in FIG. 1 and used in further, particularly preferred embodiments are those which contain only one shear element or two shear elements (stator/rotor pairs), in order thus to optimize the throughput and the precipitation quality. The space left by the omitted shear element or shear elements, for example the space (13) left by the omitted stator/rotor combination (13a/13b), is preferably filled by an exactly fitting displacer element so that no additional dead volumes are formed in the apparatus. A cylindrical displacer element replacing the stator/rotor combination (13a/13b), for example in the space (13), exactly fills the space left by the stator/rotor combination, whose central bore corresponds to the internal diameter of the feed line. This apparatus innovatively modified compared with commercially available apparatuses has proven surprisingly advantageous not only for the novel process but generally for apparatuses of this type for the preparation or coagulation of polymer dispersions.

As stated, apparatuses which can be used for the novel process for the continuous coagulation of graft rubber dispersions, with the exception of the apparatus described above and modified with displacer elements, are known and obtainable as dispersing apparatuses. They are therefore used for preparation and distribution of fine polymer particles in the aqueous dispersion, whereas they serve in the novel process for destroying the aqueous polymer dispersion by producing larger coagulated polymer particles. The present invention therefore furthermore relates to the use of these apparatuses for coagulating aqueous dispersions of graft rubbers by shearing, the use of the described novel apparatuses having at least one displacer element generally relating to the dispersing and coagulation of polymer dispersions.

According to the invention, aqueous dispersions of graft rubbers are coagulated, the process having proven particularly useful for coagulating aqueous dispersions of graft rubbers which have elastomeric acrylate polymers as the grafting base (P1). In the dispersions to be coagulated according to the invention, the graft rubbers are present in particular with solids contents of from 20 to 65, preferably from 30 to 60, % by weight. The novel process can therefore be used directly for the dispersions as obtained by graft polymerization in aqueous dispersion.

Graft rubbers whose aqueous dispersions are coagulated according to the invention are understood as meaning graft polymers in which monomers, in particular styrene, acrylonitrile and/or methyl methacrylate, forming hard thermoplastics are grafted, as graft shell (P2), onto particle cores comprising soft rubber (P1), this being effected by polymerization or copolymerization of the monomers for the graft shell (P2) in the presence of the rubber particles (P1). In this procedure, some of the monomers or resulting polymers form a linkage with the surface of the rubber particles, which can be increased by specific known process measures (increase of grafting yield). By repeating the grafting measure, it is also possible to prepare graft rubbers having more than one graft shell (P2).

Suitable soft rubbers (grafting base P1) for the preparation of the graft rubbers are elastomeric polymers and/or copolymers having glass transition temperatures of less than $-10°$ C. and preferably less than $-30°$ C. Elastomeric 1,3-diene homo- and copolymers, such as butadiene, isoprene or chloroprene homo- and copolymers, preferably butadiene rubber, and elastomeric acrylic ester homo- and/or copolymers having the stated low glass transition temperatures are particularly suitable. Elastomeric acrylic ester polymers are preferred for the graft rubbers coagulated according to the invention, for example homo- and copolymers of $C_4$–$C_8$-alkyl acrylates, in particular of n-butyl acrylate and/or 2-ethylhexyl acrylate. Examples of preferred comonomers of the alkyl acrylates are crosslinking monomers having at least two nonconjugated C=C double bonds, such as diallyl maleate, diallyl phthalate, diacrylates and dimethacrylates of diols, such as 1,4-butanediol or 1,6-hexanediol, etc., preferably allyl methacrylate or dihydrodicyclopentadienyl acrylate, which are used in particular in an amount of from 0.5 to 10% by weight of the total amount of monomers in the elastomer preparation, and furthermore polar monomers, such as acrylic acid, methacrylic acid, maleic anhydride, acrylamide, methacrylamide, N-methylolacrylamide or N-methylolmethacrylamide and the alkyl ethers thereof. The amount of elastomers (P1) in the graft rubber (P) is in general from 30 to 85% by weight, and the novel process can also advantageously be used for processing, preferably, graft rubbers (P) which contain more than 50, for example from about 55 to about 85, % by weight, based on the total solids content, of elastomer (P1).

Particularly suitable monomers for polymerizing on the graft shell (P2) are monomers and mixtures thereof which form hard polymers or copolymers having glass transition temperatures of more than +50° C. The type of the monomer or monomers for this purpose depends substantially on the type of thermoplastics which, after blending with the graft rubber, will form the polymer matrix and with which the graft shell should have a certain compatibility or affinity in order to achieve ,a fine two-phase distribution of the graft rubbers in the matrix. Particularly suitable and conventional monomers for the graft shell are vinyl- and alkenylaromatic monomers of 8 to 12 carbon atoms, such as styrene, α-methylstyrene, and styrenes and α-methylstyrenes which carry one or more alkyl, in particular methyl, groups as substituents on the benzene nucleus. They may be the sole monomers for the preparation of the graft shell (P2) or may be used as a mixture with other monomers, such as methyl methacrylate, methacrylonitrile and, preferably, acrylonitrile, the graft shell containing from 0 to 45, preferably from 10 to 40, % by weight, based on the graft shell, of methacrylonitrile and/or acrylonitrile monomer units. Mixtures of styrene with from 10 to 40% by weight, based on the total amount of monomers, of acrylonitrile are preferred. Preferred further monomers for the preparation of the graft shell are also methacrylic esters and acrylic esters, among which methyl methacrylate is preferred and may also be used as the sole or predominant monomer for the preparation of the graft shell. However, maleic anhydride, maleimide, N-phenylmaleimide, acrylic acid and methacrylic acid are also among the suitable comonomers for the preparation of the graft shell (P2).

Particularly suitable for the novel coagulation process are graft rubber dispersions which were prepared by grafting the elastomers with the monomers for the graft shell, at least in the last process stage of the graft polymerization, in aqueous emulsion and then particularly in the presence of anionic emulsifiers. Conventional anionic emulsifiers are, for example, alkali metal salts of alkanesulfonic or alkylarylsulfonic acids, alkylsulfates, fatty alcohol sulfonates, salts of fatty acids of 10 to 30 carbon atoms or resin soaps. Emulsions prepared using sodium salts of fatty acids of 10 to 18 carbon atoms (anionic soaps) or alkanesulfonates as anionic emulsifiers are very suitable. The anionic emulsifiers are used in amounts of from 0.5 to 5, in particular from 1 to 2, % by weight, based on the amount of monomers. An excess of emulsifier is avoided where subsequent coagulation of the graft rubber emulsions by shearing is intended.

The Examples and Figures which follow are intended to illustrate the novel process in more detail but not to limit it. Parts and percentages are by weight, unless stated otherwise.

EXAMPLE 1 a) Preparation of the graft rubber dispersion with polybutadiene as the grafting base 60 parts of butadiene were polymerized to a monomer conversion of 98% in a solution of 0.6 part of tert-dodecyl mercaptan, 0.7 part of sodium $C_{14}$-alkanesulfonate as emulsifier, 0.2 part of potassium peroxodisulfate and 0.2 part of sodium disulfate in 80 parts of water at 65° C. In the resulting latex, the polybutadiene had a mean particle size of 100 nm and was therefore agglomerated by adding 25 parts of a 10% strength emulsion of a copolymer of 96% of ethyl acrylate and 4% of methacrylamide, a mean particle size of 350 nm resulting. The glass transition temperature of the polybutadiene was −85° C.

40 parts of water, 0.4 part of sodium $C_{14}$-alkanesulfonate and 0.2 part of potassium peroxodisulfate were added to the product.

40 parts of a mixture of 70% of styrene and 30% of acrylonitrile were added gradually in the course of 4 hours and the batch was kept at 75° C. while stirring. The monomer conversion was virtually quantitative. The glass transition temperature of a copolymer of 70% of styrene and 30% of acrylonitrile was about +105° C.

b) Coagulation of the dispersion prepared according to a)

The coagulation of the graft rubber dispersion was carried out by the novel process, the apparatus used being a Dispax 3/6/6 dispersing apparatus from Janke & Kunkel, which contained two rotor/stator combinations (both coarse) with a stator external diameter of about 60 mm and a rotor external diameter of 55 mm as shear elements. Otherwise, the apparatus was similar to the apparatus (10) shown in FIG. 1. The dispersion was fed axially to the apparatus at 77° C. In the first shear element (13), the stator 2 and the rotor 2 had toothed rings (cf. FIG. 2) and the space 14 remained empty, and, in the second shear element (15), the stator and the rotor each had a toothed ring, the rotor also containing turbine blade-like displacer strips (cf. FIG. 3). The speed of the rotors was 7500 revolutions per minute and the throughput of the apparatus was 200 kg/hour. A coagulum which had a dry appearance, a residual moisture content of 57% and a mean particle size of 1 mm in conjunction with a broad particle size distribution (0.05–5 mm) emerged from the apparatus. The coagulum was introduced in free fall into a stirred kettle containing hot water. The product could then be readily dewatered by decanting, centrifuging and drying. The resulting product could then be used directly as an impact modifier by mixing into styrene/acrylonitrile copolymers in an extruder.

EXAMPLE 2 a) Preparation of the graft rubber dispersion with polybutadien as the grafting base The preparation was carried out as described in Example 1a).

b) Coagulation of the dispersion prepared according to a)

The coagulation of the graft rubber dispersion was carried out by the novel process, the apparatus used being a Dispax 3/6/6 dispersing apparatus from Janke & Kunkel. The apparatus is similar to the apparatus (10) shown in FIG. 1. The first shear element (13) was replaced by a fitted cylindrical displacer element having a central bore, which element completely filled the space (13) without dead space, and the internal diameter of the central bore corresponded to the internal diameter of the feed line. The shear element (14) was a stator/rotor combination (14a/14b) having coarse teeth. The shear element (15) had a stator/rotor combination (15a/15b) according to FIG. 3. The speed was 7500 revolutions per minute, the temperature 75° C. and the throughput 300 kg/hour. Crumbly product was obtained and was worked up as stated in Example 1. The moisture content was 55.3%, the particle size on average was 1 mm and the particle size distribution was broad (0.04–4 mm).

EXAMPLE 3 a) Preparation of the graft rubber dispersion with elastomeric polyacrylate as the grafting base 160 parts of a mixture of 98% of butyl acrylate and 2% of dicyclopentadienyl acrylate were heated to 60° C., while stirring, in 1500 parts of water with the addition of 5 parts of the sodium salt of a $C_{12}$–$C_{18}$-paraffinsulfonic acid, 3 parts of potassium peroxodisulfate, 3 parts of sodium bicarbonate and 1.5 parts of sodium diphosphate. 15 minutes after the beginning of the polymerization reaction, a further 840 parts of the monomer mixture were added in the course of 3 hours.

After the end of the monomer addition, the emulsion was kept at 60° C. for a further hour. The glass transition temperature of the elastomer was −42° C.

1150 parts of water and 2.7 parts of potassium peroxodisulfate were added to 2100 parts of the emulsion, and the mixture was heated to 65° C. while stirring. After this temperature had been reached, 560 parts of a mixture of 75 % of styrene and 25 % of acrylonitrile were metered in over 3 hours. After the end of the addition, the batch was kept at 65° C. for a further 2 hours. The glass transition temperature of a copolymer of 75% of styrene and 25% of acrylonitrile was +111° C.

b) Coagulation of the dispersion prepared according to a)

The coagulation was carried out by the novel process, the apparatus used being a laboratory apparatus which was similar to the shearing apparatus (10) shown in FIG. 1 and which had, as the process section, two shear elements (14, 15) each having a slotted rotor (14b, 15b) and each having a slotted stator (14a, 15a) firmly connected to the housing. The shear element (13) was replaced by an exactly fitted cylindrical displacer element having a central bore. The external diameter of the stators (14a, 15a) was about 60 mm and that of the rotors (14b, 15b) about 53 mm.

Stator (14a) and rotor (14b) are shown schematically in FIG. 2, and stator (15a) and rotor (15b) in FIG. 3. The gap width between rotor tooth system and stator tooth system was about 0.75 mm. The graft rubber dispersion was fed axially to the apparatus at 60° C. and transported in the shear elements radially from the inside to the outside. The rotor speed was 8000 revolutions per minute and the throughput 440 kg/hour. A product in the form of a moist slurry was discharged radially at the outlet orifice (17). It was converted into larger agglomerates by heating with steam under superatmospheric pressure to above the glass transition temperature $T_g$ of the graft shell, and said agglomerates could be readily dewatered by decanting, centrifuging and drying. The resulting product was very suitable as an impact modifier for the preparation of ASA polymers.

List of reference numerals

| | |
|---|---|
| 10 | Apparatus |
| 11 | Housing |
| 12 | Drive shaft |
| 13 | First shear element |
| 13a | First stator |
| 13b | First rotor |
| 14 | Second shear element |
| 14a | Second stator |
| 14b | Second rotor |
| 15 | Third shear element |
| 15a | Third stator |
| 15b | Third rotor |
| 16 | Inlet orifice |
| 17 | Outlet orifice |
| 21 | inner toothed ring of the stator |
| 22 | outer toothed ring of the stator |
| 23 | outer stator wall |
| 25 | inner toothed ring of the rotor |
| 26 | outer toothed ring of the rotor |
| 27 | shear elements |
| 28 | Turbine blade |

We claim:

1. A process for the continuous coagulation of aqueous dispersions of graft rubbers (P) which
   a) contain, as soft grafting base (P1), elastomeric polymers and/or copolymers of 1,3-dienes or acrylic esters having a glass transition temperature $T_g$ of less than −10° C. in an amount of from 30 to 85% by weight of the amount of graft rubber (P) and
   b) contain a hard one-shell or multishell graft shell (P2) comprising monomer units which form a thermoplastic polymer or copolymer having a glass transition temperature of more than +50° C. and whose content of acrylonitrile or methacrylonitrile monomer units is from 0 to 45% by weight, and
   c) at least in the last stage of the graft polymerization, were prepared by emulsion polymerization of the monomers for the graft shell (P2) in the presence of the grafting base (P1), which process comprises transporting the graft rubber through an apparatus (10) having at least one shear element (13, 14, 15) with a stationary circular slotted stator (13a, 14a, 15a) and a slotted rotor (13b, 14b, 15b) which rotates within the stator and is mounted on a rotatably mounted drive shaft (12), so that the graft rubber dispersion introduced into the apparatus (10) is passed radially from the inside to the outside as a result of the rotation of the rotor (13b, 14b, 15b) in the shear element (13, 14, 15) and, during or after passage through the slots of the rotor (13b, 14b, 15b) and stator (13a, 14a, 15a), is subjected to shearing having a shear velocity in the shear element (13, 14, 15) of from 4 to 30 m/second which is so strong that coagulation of the graft rubber dispersion takes place.

2. A process as claimed in claim 1, wherein the apparatus (10) contains two or three shear elements (13, 14, 15), each having a stator/rotor combination.

3. A process as claimed in claim 1, wherein the graft rubber dispersion is introduced axially into the apparatus (10) through an inlet orifice (16) and fed to the first shear element (13a) and, after having passed the shear element or elements (13, 14, 15), the resulting coagulated product is discharged from the apparatus (10) through a radially arranged outlet orifice (17).

4. A process as claimed in claim 1, wherein the apparatus (10) contains a plurality of shear elements (13, 14, 15) and each rotor (13b, 14b, 15b) and stator (13a, 14a, 15a) has, for shearing, from one to three concentrically arranged rows of teeth formed by axial slots.

5. A process as claimed in claim 1, wherein the coagulation is effected in the shearing apparatus with only one shear element or two shear elements (13, 14, 15), and the space left by at least one omitted shear element is filled by a displacer element to avoid dead volumes.

6. A process as claimed in claim 1, wherein at least one rotor (13b, 14b, 15b) which has blades arranged in the axial or radial direction is used.

7. A process as claimed in claim 1, wherein at least one of the rotors (13b, 14b, 15b) has turbine blade-like displacer strips.

* * * * *